United States Patent [19]

Doty et al.

[11] Patent Number: 5,050,815
[45] Date of Patent: Sep. 24, 1991

[54] COMPACT SAFETY BELT RETRACTOR

[75] Inventors: Gerald A. Doty, Crown Point, Ind.; James L. Zygutis, Frankfort, Ill.

[73] Assignee: Occupant Safety Systems Inc., Olympia Fields, Ill.

[21] Appl. No.: 467,170

[22] Filed: Jan. 18, 1990

[51] Int. Cl.$^5$ .............................................. B60R 22/40
[52] U.S. Cl. ........................ 242/107.4 A; 242/107.4 C
[58] Field of Search ................ 242/107.4 A, 107.4 B, 242/107.4 C, 107.4 R; 280/806; 297/478

[56] References Cited

U.S. PATENT DOCUMENTS

| | | | |
|---|---|---|---|
| 3,917,188 | 11/1975 | Nilsson | 242/107.4 A |
| 3,921,930 | 11/1975 | Fohl | 242/107.4 A X |
| 4,337,906 | 7/1982 | Colasanti et al. | 242/107.4 A |
| 4,366,934 | 1/1983 | Seifert et al. | 242/107.4 A |
| 4,422,594 | 12/1983 | Honl | 242/107.4 A |
| 4,509,707 | 4/1985 | Ernst et al. | 242/107.4 C X |
| 4,549,705 | 10/1985 | Fohl | 242/107.4 R |
| 4,635,874 | 1/1987 | Swindlehurst | 242/107.4 B |
| 4,844,375 | 7/1989 | Ballet | 242/107.4 C X |

Primary Examiner—John M. Jillions
Attorney, Agent, or Firm—Fitch, Even, Tabin & Flannery

[57] ABSTRACT

A compact safety belt retractor is provided with a large coil of webbing on a rotatable reel and locking pawl teeth are able to have locking engagement with toothed wheels on the reel even when the coil of webbing has a larger diameter than the diameter of a circle defined by the teeth of the ratchet wheels. The coil of webbing preferably extends the full depth of the retractor from front edges of the sidewalls of the frame to the rear frame wall of the retractor. Thus, a large coil of webbing may be stored for the depth of the retractor. To reduce the side-to-side width of retractor, it is preferred to have reel ratchet wheels mounted in the plane of the frame sidewalls and to have the pawl teeth also mounted in openings in the sidewalls of the retractor frame. The pawl teeth are elongated columns and are loaded in columnar manner with substantially small shear or bending stresses thereon. At very high loading on the belt, as at the time of accident, the reel may deflect to shift the toothed wheels to directly engage the bearing surfaces on the sidewalls of the frame when the reel is locked. Both the locking pawls and the toothed wheels are substantially coplanar with the sidewalls of the frame and are disposed within openings in the sidewalls.

9 Claims, 5 Drawing Sheets

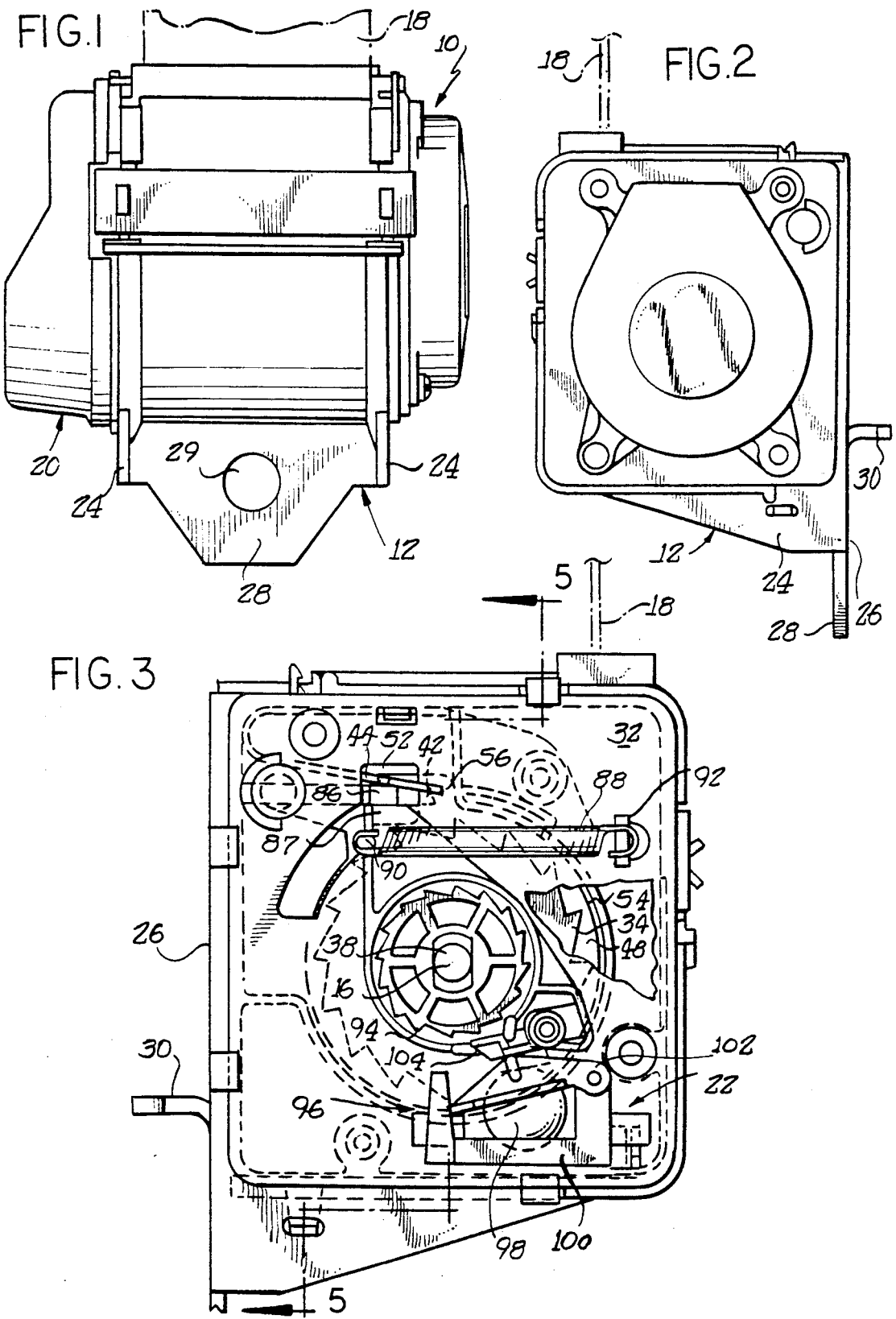

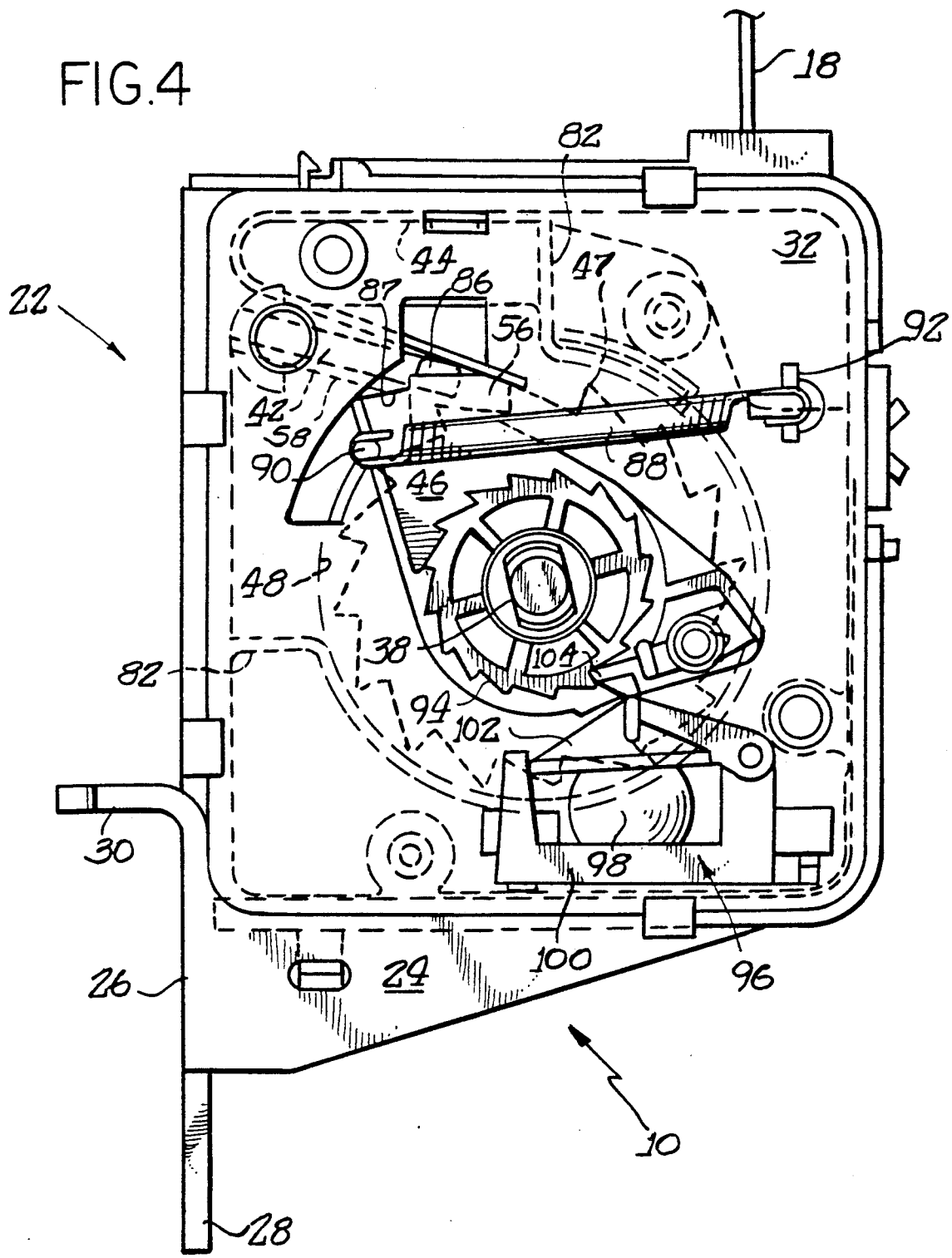

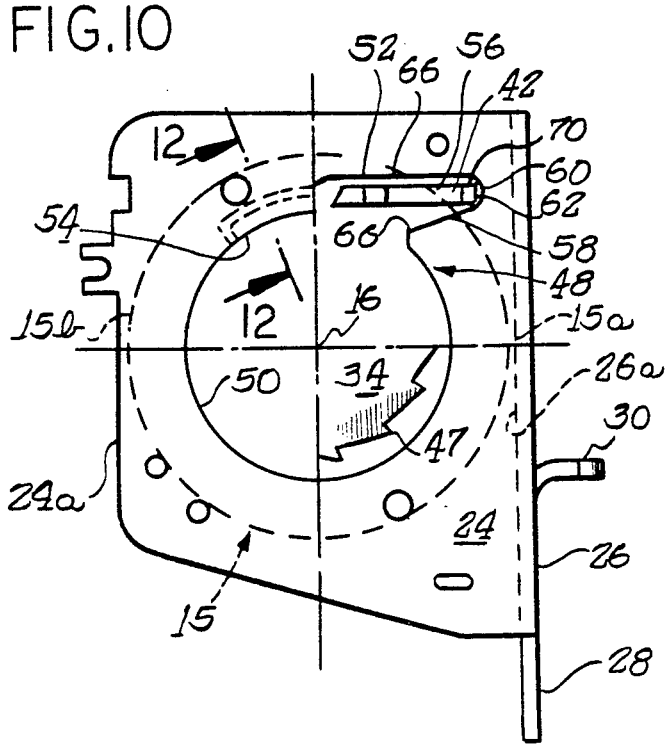
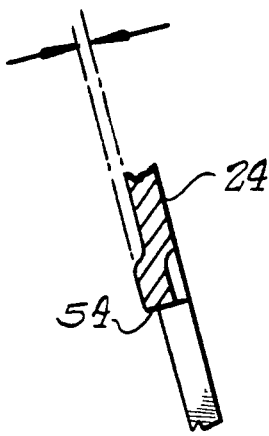
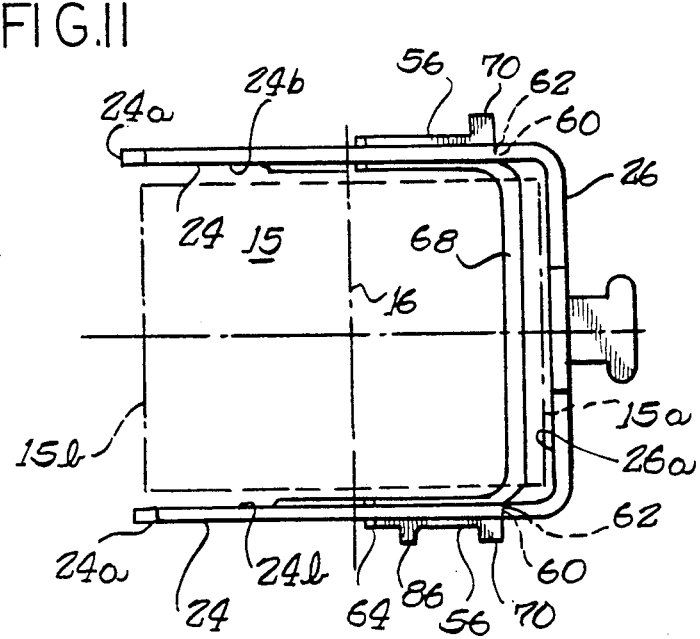

COMPACT SAFETY BELT RETRACTOR

BACKGROUND OF THE INVENTION

The invention relates generally to safety belt retractors, and more particularly to a compact safety belt retractor which is suitable for automotive use.

In many passive or automatic seat belt systems, the seat belt extends from the car door into the location between the front seats. These systems require a longer seat belt than the non-passive systems where the seat belt is not hooked to the vehicle door. The present invention is directed to solving the problem of how to store a long length of seat belt in a coil in a small, compact retractor and still allow the pawls to have locking engagement with the pair of ratchet wheels, which are fixed to the reel shaft. Often the timing of this locking engagement is controlled by an additional plastic, drive ratchet wheel and a plastic drive pawl operated by an inertia mass with engagement of the plastic drive causing a timed actuation of the lock bar pawls into spaces between teeth on the ratchet wheels. This time relationship assures that the pawls do not bounce off the tips of the ratchet wheels. In such retractors, there is a channel or U-shaped retractor frame supporting the reel with the ratchet wheels located inside of the frame. The lock bar is pivotally mounted in the frame. At the time of locking engagement between the ratchet wheels and locking pawls, the load from the belt and reel is transferred from the ratchet wheels to the engaged lock bar pawls and laterally outward across the lock bar ends to the pivot locations where the ends of the lock bar are in metal-to-metal, pivotal contact with the sidewalls of the retractor frame. Because of the transfer of high loads, the pawls or lock bar tips and end portions are quite wide. Thus, substantial portions of the lock bar pawls extend inwardly over the belt coil. When the seat belt is fully wound, a large coil of seat belt extending beyond the diameter defined by the ratchet wheel teeth will engage the wide lock teeth and prevent them from engaging and locking with the ratchet wheel teeth. Therefore, if one merely adds more belt to the usual size of reel, the belt coil will be so large that the coil diameter is larger than the locking ratchet teeth diameter. Then, the locking pawls will be held from displacing into the space between adjacent teeth when the reel is fully wound. Unless provision is made to allow the locking bar and pawls to have their full travel to stop reel rotation when the belt is fully wound or almost fully wound, the plastic drive pawl or pick will break or the plastic drive ratchet wheel will break when trying to actuate the locking bar to have its full extent of travel as the reel continues to turn the plastic, drive ratchet wheel.

While the problem can be overcome merely by making the retractor reels and ratchets larger in size, there are many times when the amount of space allotted for the retractor does not accommodate such enlargements of the retractor size. Also, larger size retractors add weight and material cost to the ultimate vehicle when sold. Thus, there is a need for a compact retractor which can have a full spool of webbing of a diameter larger than that defined by the ratchet wheel teeth and still lock the locking pawls and ratchet wheels without risking damage to the drive pawl and drive ratchet wheel.

A general object of the invention is to provide a compact retractor of the foregoing kind.

SUMMARY OF THE INVENTION

In accordance with the invention, there is provided a compact safety belt retractor having a reel with toothed wheels at its opposite ends disposed within cutouts in the sidewalls of the frame, and having a pawl located in the planes of the respective sidewalls for selectively locking the reel against rotation even when reel has a full coil of seat belt webbing larger in diameter than that defined by the ratchet wheel teeth. Herein, the retractor is very compact with its dimensions being substantially defined by the diameter of the belt coiled on a reel shaft.

The disposition of the toothed wheels within cutouts in the sidewalls of the retractor frame and the pawls in the planes of the sidewalls enable constraint of the reel to be achieved with a compact retractor which can lock with such a full spool to thereby avoid breaking of the plastic drive pawl or elastic drive wheel. The edges of the cutouts provide load-bearing surfaces for constraining the reel against continued translation by direct engagement with the toothed wheels should the retractor experience an extremely high load at the time of an accident. The toothed wheels are normally maintained out of contact with the sidewalls of the frame by bearing members which can flex under very high loads.

The strength requirements of the structural pawl are reduced by providing that the load-bearing portions of the pawl are substantially in column load during locking, with little or no shear stresses or bending stresses. This enables a substantial reduction of the width of the crossbar portion of the lock bar because the high loads are not transferred laterally as in the conventional retractor.

Additional advantages of the invention are set forth below and, in the accompanying drawings.

BRIEF DESCRIPTION OF THE DRAWINGS

FIG. 1 is a front elevational view of a retractor in accordance with the invention;

FIG. 2 is a side elevational view of the retractor of FIG. 1, taken from the right-hand side of FIG. 1;

FIG. 3 is a side elevational view of the retractor of FIG. 1, taken from the left-hand side of FIG. 1, shown with the cover removed and with portions broken away to better illustrate the various components, and with the locking mechanism in its unlocked position;

FIG. 4 is a side elevational view similar to FIG. 3, except that it shows the locking mechanism in its locking position;

FIG. 10 is a right-hand side elevational view of the retractor;

FIG. 11 is a bottom view of the frame of FIG. 10; and

FIG. 12 is a fragmentary sectional view of the frame of FIG. 10, taken substantially along lines 12—12 in FIG. 10.

DETAILED DESCRIPTION OF PREFERRED EMBODIMENT

Figure 5:
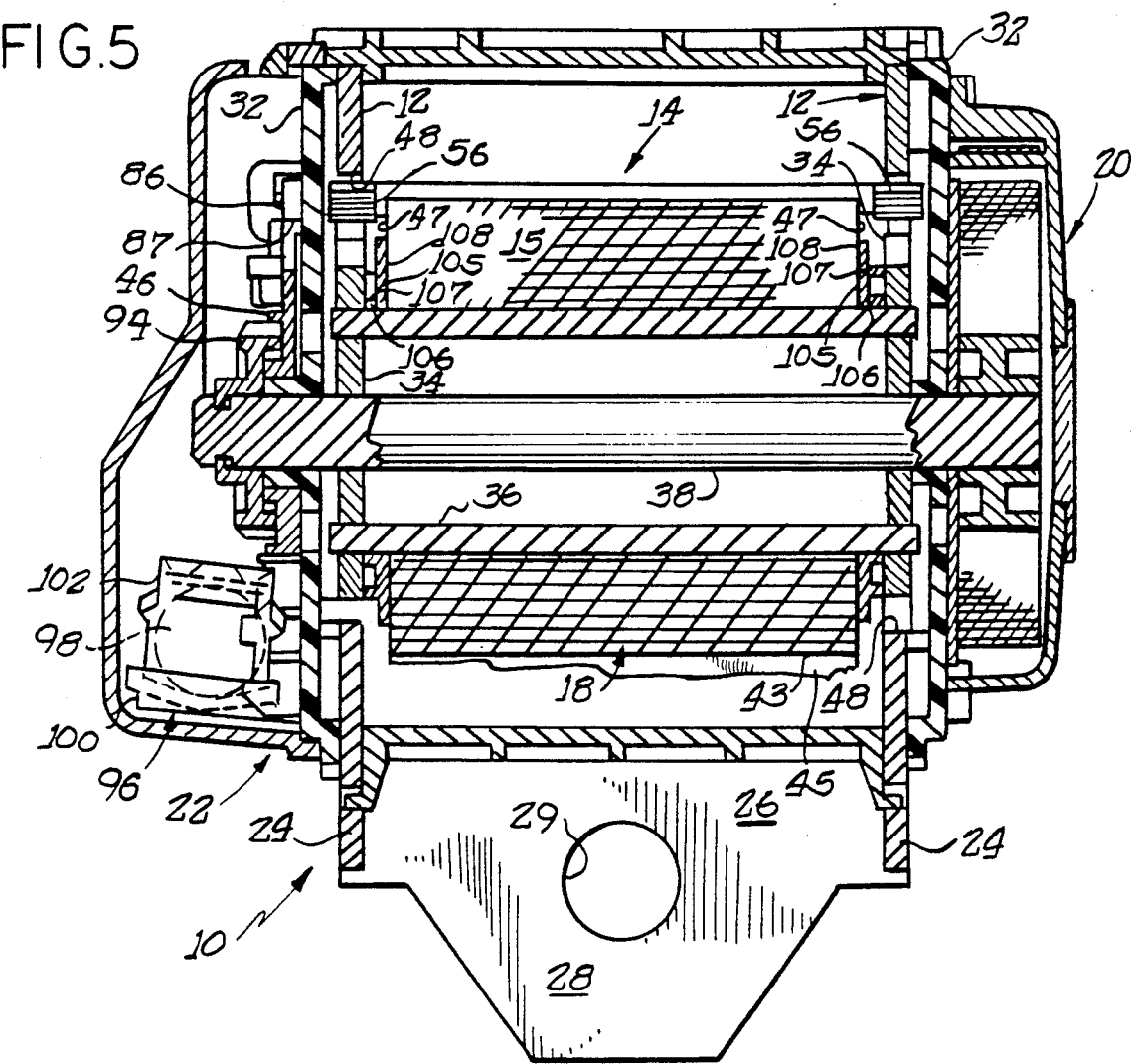
FIG. 5 is a sectional view taken substantially along lines 5—5 in FIG. 3.
Figure 6:
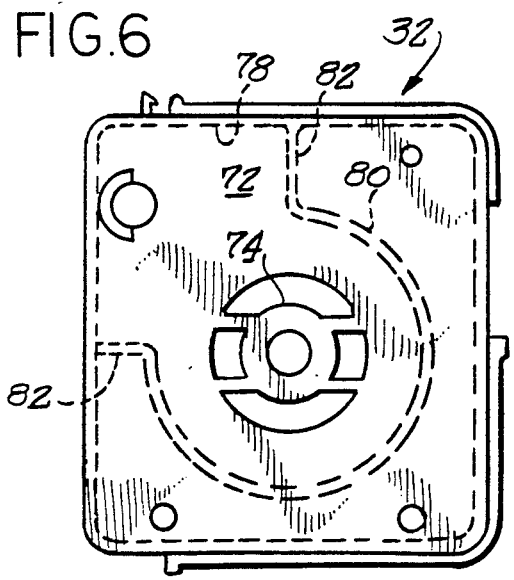
FIG. 6 is a side elevational view of the bearing member on the right-hand side of the retractor as viewed in FIG. 5.
Figure 7:
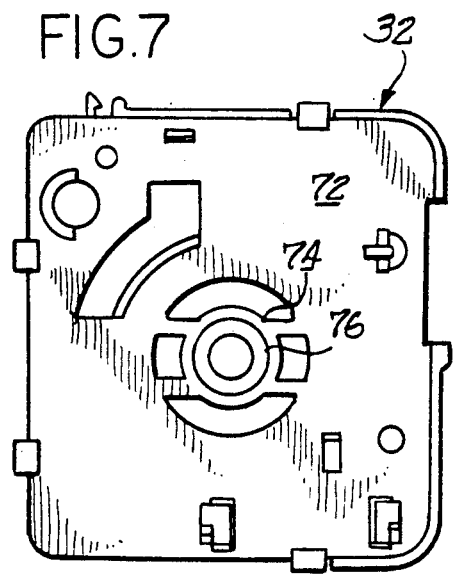
FIG. 7 is a side elevational view of the bearing member on the left-hand side of the retractor as viewed in FIG. 5.

The invention is generally embodied in a safety belt retractor 10 for an automobile or other vehicle comprising a frame assembly 12, a reel 14 supported on the frame 12 to turn about an axis 16 and having a length of belt 18 or webbing wound thereon into a coil 15, a spring drive 20 biasing the reel 14 for retraction, and a locking mechanism 22 for selectively locking the reel 14 against protraction under emergency conditions, such as rapid deceleration or upset of the vehicle.

The frame 12 comprises an integral metal unit having a pair of sidewalls 24 and a base portion or rear wall 26 extending therebetween. The sidewalls 24 are substantially planar, except as noted below. The rear wall 26 has a large mounting lug 28 extending downward from its lower end, with a bolt hole 29 formed therein for attachment of the frame 12 to a vehicle frame member. The illustrated rear wall 26 further has a second mounting lug 30 extending perpendicularly outward therefrom for cooperation with the vehicle frame. To support the reel 14 for rotation during normal operation, each of the sidewalls 24 has a support member 32 affixed thereto.

The reel 14 comprises a pair of toothed wheels 34, each preferably having a ratchet-tooth configuration, connected by a drum or cylinder 36 on which the belt web 18 is wound, and by a central shaft 38 disposed coaxially within the cylinder. The shaft 38 is rotatably supported on the support members 32. The ratchet wheels 34 are connected rigidly to the cylinder 36 and shaft 38 to maintain their coaxial, spaced relationship.

The locking mechanism 22 employs a structural pawl 42 which selectively engages the ratchet wheels 34 to lock the reel against rotation during emergency conditions. The pawl 42 is normally biased toward the ratchet wheels 34 by a spring 44, but blocked from engagement therewith by a block-out disc 46. To permit selective engagement of the ratchet wheels 36 by the pawl 42, an inertia-operated trigger mechanism selectively connects the block-out disc 46 to the reel 14 so that it is rotated to an inoperative position when an emergency condition is sensed during protraction of the belt 18.

In accordance with the present invention, a very compact retractor in size relative to the coil 15 of seat belt thereon is provided with the seat belt coil extending between the rear wall 26 (FIGS. 10 and 11) and front edges 24a of the retractor frame sidewalls 24. As seen in FIGS. 10 and 11, the coil 15, which is shown in phantom lines, has an interior rear surface 15a which almost touches the interior surface 26a of the retractor rear wall 26. The coil or spool of belt has a radius that extends from adjacent this interior rear wall surface 26a to the reel axis 16 which is also a longitudinal axis through the center of the belt coil. The front edges 24a of the sidewalls 24 define the front edge of the retractor and it will be seen that the full spool of belt extends thereto and that belt coil occupies substantially the entire depth of the retractor from front to rear. By way of example only, the belt coil will occupy substantially all of the depth of 65 mm from the front edges 24a of the sidewalls to the interior rear wall surface 26a. This is in contrast to the diameter of ratchet wheel teeth of about 40 mm. The coil 15 extends substantially beyond the tops 47 of the teeth of the ratchet wheels 34, which are shown partially in FIG. 10.

In accordance with another important aspect of the invention, the retractor is kept compact in the side-to-side direction between the sidewalls 24 by having the pawl 42 with its teeth 56 located in cutouts or openings in the sidewalls 24 and by having the ratchet wheels likewise located in cutouts or openings 48 in the sidewalls 24. This lateral dimension between interior wall surfaces 24b and 24b is in this illustrated embodiment of the invention about 54.5 mm. The overall height of the retractor frame is about 70 mm. A coil of belt of 72 inches occupies over 60 mm of this height of 70 mm. Also, as will be explained in greater detail, the pawl 42 may have thin, column loaded portions in the planes of the retractor sidewalls to provide an efficient manner of load transfer from the ratchet wheels 34 to the retractor frame and the ratchet wheels may be deflected, at extremely high loads, to engage surfaces 50 of the cutouts 48 in the sidewall.

Thus, in accordance with one aspect of the invention, the toothed wheels 34 of the reel 12 are preferably located within cutouts 48 in the sidewalls of the frame. As shown in FIG. 10, each of the cutouts 48 defines a partially circular-cylindrical surface 50 extending through an arc of about 310°, with a slot 52 extending upward therefrom and toward the base portion 26 for accommodating the structural pawl 42. The reel 14 is constrained against transverse displacement under heavy load by contact between the toothed wheels 34 and portions 54 of the arcuate interior surface 50 defined by the cutouts in the sidewalls. To this end, the support members 32 which support the shaft of the reel 14 are resiliently flexible to permit small displacements of the reel in transverse directions. When the reel is subjected to unusually high loads, e.g., impact loads due to emergency conditions, flexure of the support members 32 permits sufficient translation of the reel to bring the toothed wheels 34 into contact with the load-bearing portions 54 of the cutout surface 50. The load-bearing portions 54 are indented slightly inward on each sidewall. The engagement between the toothed wheels and the load-bearing surfaces 56 under emergency conditions enables impact loads to be transmitted directly to the sidewalls of the frame through the toothed wheels, so that the support members 32 which engage the shaft 38 of the reel 14 need not be capable of supporting such loads.

During emergency conditions, the reel 14 is subject both to translational forces and torque urging the reel in the direction of protraction The reel is thus locked against rotation by contact between the toothed wheels 34 and the pawl 42.

Figure 8:
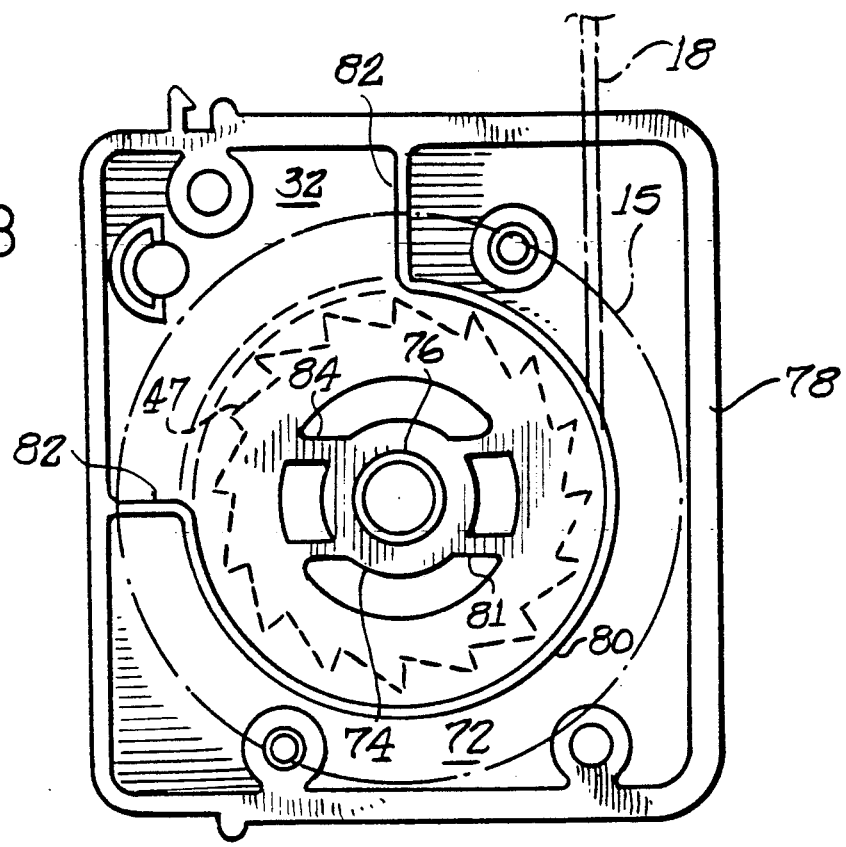
FIG. 8 is a left-hand side elevational view of the bearing member on the left-hand side of FIG. 5, similar to FIG. 6, but showing in phantom the reel during normal operation of the retractor.
Figure 9:
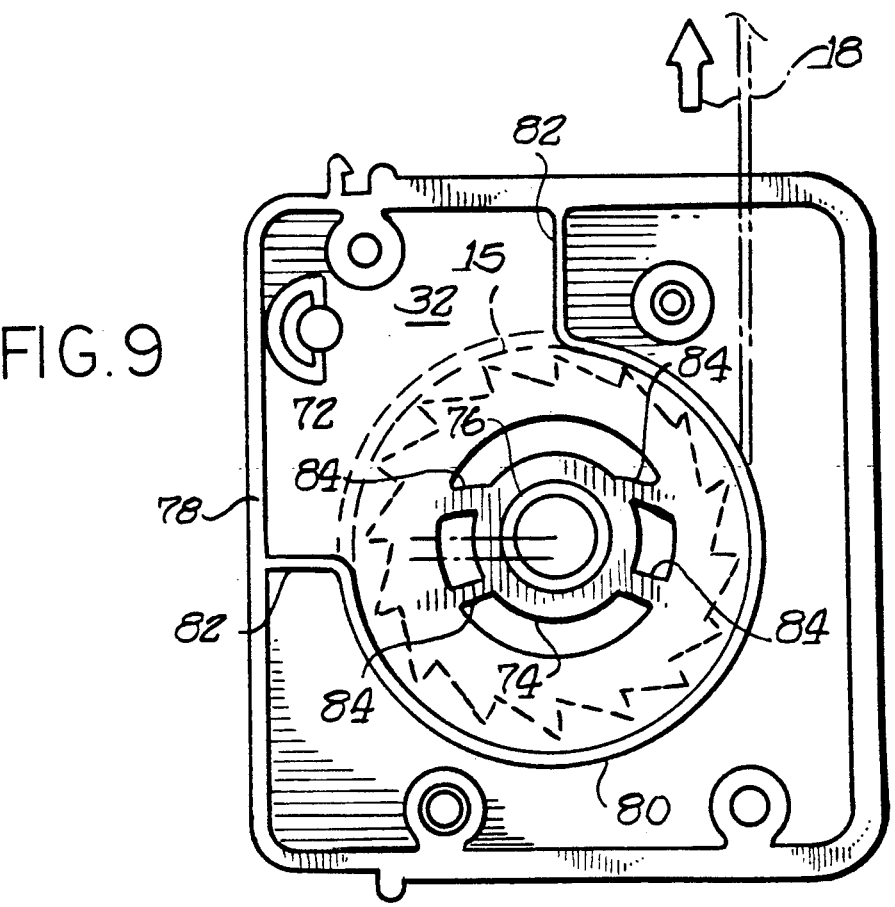
FIG. 9 is a left-hand side elevational view similar to FIG. 8, but showing the reel in an upwardly displaced position.

As will be explained in greater detail hereinafter, the locking of the retractor is accomplished by the inertia-locking mechanism 22 which includes an inertia member or mass 98 in the form of a ball which operates a drive pawl 104 to insert its tooth into a drive ratchet wheel 94. Both the drive pawl and the drive ratchet wheel 94 are made of plastic and the stopping of drive ratchet actuates the blocking member to cause the locking pawl 42 to engage the locking ratchet wheels 34 to stop reel rotation and belt protraction. The plastic drive pawl and the plastic drive wheel are subject to breaking if they drive against the locking pawls and it does not move to stop the reel rotation. That is, the reel will continue to rotate the plastic drive ratchet and usually it is the plastic drive pawl that breaks. One situation in the prior art in which the plastic drive pawl may break is where the reel or spool is full of webbing at the time the plastic drive pawl is engaged with the plastic ratchet wheel and the pawl tips or teeth of the lock bar rest on or blocked by the belt coil 15 which is larger in diameter than the diameter of the circle defined by the teeth of the ratchet wheel. Thus, the pawl tips on the lock bar cannot move radially inwardly of the outer belt coil to engage the metal ratchet teeth and stop reel rotation. As best seen in FIGS. 5, 8 and 9, outer coils or wraps 43 and 45 of belt on the reel are radially outward of the tips 47 of the ratchet wheel and would prevent the teeth of a conventional lock bar from reaching the tips 47 of the ratchet teeth to lock the l against rotational movement that would prevent continued rotation of the plastic drive ratchet wheel 94 against the plastic drive pawl, causing this pawl to break.

In the conventional prior art retractors, the force transmitted from the reel and ratchet wheels is transmitted laterally along the lock bar to the pivot points at the retractor frame at which the lock bar has metal-to-metal engagement with the metal retractor frame. Because the laterally-transmitted forces are quite large, the cross bar portion of the lock bar is quite wide.

In accordance with the present invention, however, the ratchet wheels 34 are located in cutouts 48 in the retractor frame side-walls and the locking pawls 42 are also located in the plane of these sidewalls. With the pawl tips in the plane of the sidewalls, the pawl tips will not engage the belt coil. Hence, the belt coil may be larger than the diameter of a circle defined by the tips 47 of the ratchet teeth and still move into engagement with the ratchet teeth and lock the reel and thereby prevent the plastic drive pawl 104 from being broken, as above-described. As best seen in FIGS. 10 and 11, pawls 42 are long and columnar in shape and the load from the ratchet wheels is taken in a straight line down the length of the pawl as a column, straight load back to base 62 of the pawl tooth where it pivots and has metal engagement with end 60 of the pivot point or slot in the retractor frame sidewall. Because there is no large lateral load to be transferred from the teeth laterally along a wide cross bar, as in the conventional lock bar, the cross bar 68 may be very small in width as seen in FIG. 11.

The thin width of the cross bar 68 and the placing of the ratchet wheels 34 and pawls 42 in the plane of the retractor side frames substantially reduces the size of the retractor. Thus, the retractor may have a large full spool of belt webbing for reaching to the car door when it is opened end still be small enough to fit in small places. The retractor may be termed a "compact retractor" because of its small size.

Thus, the pawl 42 has its pair of load-bearing members or teeth 56, loaded substantially in column load during engagement with the ratchet wheels 34. By providing for column load to the teeth 56, shearing stresses and bending stresses which have been present in the lock bars of prior retractors are substantially eliminated.

Thus, it will be been in FIG. 5 that the pawl teeth 56 and the ratchet wheels are substantially coplanar with the respective retractor sidewalls 24. Also, as seen in FIG. 5, the pawl teeth 56 are located outwardly of side edges 47 of the seat belt webbing coil 41 and are able to engage the ratchet wheels when the coil is fully wound on the reel.

The coil 15 of the belt is kept centered on the reel by a washer or spacer means which herein comprises a pair of plastic discs or washers 105 (FIG. 5) of annular shape having an interior circular wall 106 mounted on the cylindrical surface of the reel cylinder 36. The spacers 105 are positioned between side edges 47 of the belt coil 15 and the interior facing sides of the retractor frame sidewalls 24. Preferably, each of the spacers has a pair of rings 107 which project outwardly from the main body of the spacers to abut the frame sidewalls 24 and has a flat interior wall to abut a side edge 47 of the belt coil. The spacers keep the webbing from moving into engagement with the frame sidewalls and the inner edges of the ratchet teeth 56 so that pawl teeth 56 will not have their inner edges abutting against an edge of the coiled belt which would prevent full seating and locking engagement between the pawl teeth 56 and the ratchet wheel teeth. The spacers thus keep the webbing centered between the sidewalls 24 and assure that the outer wraps 43 and 45 of webbing do not engage edges of pawl teeth 56.

Herein, the column loading of the pawl teeth 56 is achieved by having each of the pawl teeth 56 disposed in a slot 58 in a respective one of the cutouts 48 the sidewalls of the frame, such that each tooth 56 has a longitudinal axis substantially coplanar with the sidewall along which the loads borne by the tooth are transmitted from the respective ratchet wheel to the sidewall. To this end, each of the slots 58 in the sidewalls has a rounded end 60 on which the base 62 of a respective pawl tooth 56 pivots. The torque on the reel thus is transmitted from the ratchet teeth to the tips 64 of the pawl teeth, which are beveled for positive engagement with the ratchet teeth, and transmitted longitudinally through the teeth to the curved interior end surfaces 60 of the slots 52. Each slot 52 includes substantially planar surfaces 66 diverging away from the rounded end 60 of the slot to define a limited range of pivoting motion for the pa 42.

The pawl teeth 56 are connected by the flat crossbar 68 to provide a stiff, integral assembly ensuring that the teeth 56 pivot in unison. To aid in maintaining the pawl 42 in its proper operating position, each tooth 56 has an outwardly extending tab 70 at its base which extends outward beyond the sidewalls of the frame into a recess in a respective one of the support members 32.

In the illustrated embodiment as shown in FIGS. 6–9, each of the support members 32 comprises a substantially rectangular plastic plate 72 having an integral plastic bushing 74 at its center. The bushing 74 has a substantially cylindrical interior surface for coaxial supporting engagement with the shaft 38, and has an inwardly extending rim 76 for engaging the outside surface of the adjacent toothed wheel to maintain the reel 14 in a centered position relative to the reel frame 12. The toothed wheels 34 contact the support members 32 only at the rims 76 on the pushings 74. The inner surfaces of the support members 32 are concave, with each of the support members 32 having a peripheral rim contacting the frame sidewalls 24 and an arcuate rib 80 which extends through about 270° around the periphery of the arcuate portion of the sidewall cutout 48 and has linear ribs 82 at its ends extending to the peripheral rim 78. The support members 32 are bolted rigidly to the frame sidewalls 24.

The support members 32 are made of plastic and will generally withstand normal locking loads. To make sure that the retractor wi-1 lock and hold at very high belt loads, for example, loads in the 2,000–3,000 pound range, the ratchet wheels 34 are allowed to be displaced to engage the metal load bearing surfaces 54 in the retractor frame sidewalls. That is, at loads above 2,000 pounds on the belt, the belt applies such force to the reel shaft that the integral bushing 74, may be displaced slightly relative to the sidewalls 24, thus permitting slight displacement of the reel 12 relative to the frame. To this end, the bushing 74 is supported preferably by a plurality of elongated resiliently flexible legs 84. As shown herein in the illustrated embodiment, each bushing 74 is supported by two pair of parallel legs 84, all extending horizontally on opposite sides of the bushing. The support member 32, including the bushing and the legs, is preferably an integral molded plastic piece. A support member 32 is shown in its normal configuration in FIG. 8. When vertical belt loads of 2,000 pounds or mo-e are transferred to the reel in the direction of belt protraction, i.e., upward, such loads displace the bushing 74 upward as shown in FIG. 9, flex the legs 84, and push the peripheral tips 47 of the ratchet teeth into contact with the load-bearing surfaces 54 of the sidewalls 24, which stop further translational movement of the ratchet wheels. The ratchet wheel teeth will dig into these sidewalls at these very high loadings and hence, the load from the pull on the belt will be transferred directly from the ratchet wheels to the sidewalls as well as from the ratchet teeth through the pawl 42 to the sidewalls 24.

As described briefly above, the structural pawl 42 is biased toward the ratchet wheels 34 by a spring 44, but normally held out of engagement with the ratchet teeth by a block-out disc 46. Under emergency conditions, the block-out disc is rotated out of blocking engagement with the structural pawl 42, permitting the pawl to engage the ratchet teeth.

Under normal conditions, as in FIG. 3, the blocking is effected by engagement between a tab or ear 86 on one of the pawl teeth 56 with a blocking surface 87 of the block-out disc 46, and the block-out disc is maintained in its blocking position by a coil spring 88 which is loaded in tension and has one end affixed to a lug 90 on the block-out disc, and the other end affixed to a lug 92 on the adjacent one of the plastic support members 32, thus biasing the block-out disc in a clockwise direction as viewed in FIG. 3.

Under emergency conditions, counterclockwise rotation of the block-out disc 46 is effected through use of inertial sensing in combination with a drive gear, or drive ratchet 94, which is fixed to the shaft 38 of the reel 14. The occurrence of an emergency such as rapid deceleration of the vehicle is sensed by a lifter subassembly 96 which employs a spherical inertia mass 98, such as a metal ball, disposed between a base member 100 and a hinged lifter member 102. Under normal conditions, the spherical element 98 is in a position of stable equilibrium between the bas-. member 100 and the lifter 102. When rapid deceleration of the vehicle or the like displaces the ball 98 from its position of stable equilibrium, the lifter 102 pivots away from the base. A drive pawl 104 mounted on the block-out disc 46 is biased by gravity or otherwise against the lifter 102, so that displacement of the lifter 102 away from the base 100 pivots the drive pawl 104 into contact with the drive ratchet 94. When the drive pawl engages the drive ratchet, the block-out disc 46 is then linked to the drive ratchet and subsequent protraction of the belt 18 rotates the block-out disc in a counterclockwise direction, as viewed in FIG. 3 When the block-out disc is rotated counterclockwise, the blocking surface 87 is rotated out of contact with the tab 86, thus permitting the structural pawl 42 to be driven by the spring 44 into contact with the ratchet reels 34, as shown in FIG. 4.

After the structural pawl 42 has moved into its locking position, the belt will perform a restraining function for a short period of time. Afterward, when belt tension is reduced, the main spring drive 20 retracts the belt, rotating the drive ratchet 94 in a clockwise direction as shown in FIG. 3, and the spring 88 then returns the block-out disc 46 to its initial position as shown in FIG. 3 camming the structural pawl 42 back upward to its initial position as it rotates.

Conclusion

From the foregoing it will be appreciated that the invention provides a novel and improved safety belt retractor which is relatively lightweight and compact and supports a very large coil of seat belt for its size. The invention is not limited to the embodiment described above, or to any particular embodiment, but rather is particularly pointed out in the following claims.

What is claimed is:

1. A safety belt retractor of compact size for storing a large length of seat belt webbing thereon in a coil, said retractor comprising:

a frame having a base portion and a pair of sidewalls extending outwardly from the base portion, a reel having a reel shaft mounted for rotation in the pair of sidewalls with the reel shaft spanning the sidewalls and with the seat belt webbing wound in a coil on the reel shaft, a pair of toothed ratchet wheels on the reel shaft for rotation with the reel shaft, tips on the teeth of the ratchet wheels defining circles off a first diameter, a lock bar spanning the pair of sidewalls and having a pair of elongated columnar pawl teeth being movable from a position spaced from the teeth on the ratchet wheels to a locking position engaging the teeth on the ratchet wheels and holding the reel against rotation and thereby further belt unwinding from the reel at first predetermined loads, said retractor frame sidewalls having cutouts formed therein with said toothed ratchet wheels located in the cutouts;

a coil of seat belt webbing on the retractor having a larger diameter than the first diameter defined by the ratchet wheel teeth tips, said coil having side edges adjacent the frame sidewalls, a vehicle sensitive inertia-actuating means including an inertia weight displaceable to actuate the lock bar to swing the pawl teeth into locking engagement with the ratchet wheel teeth, said pair of pawl teeth being disposed in the planes of the respective sidewalls laterally outwardly of the side edges of the webbing coil to engage the ratchet wheels when the coil has a larger diameter than the first diameter;

each of said elongated, columnar pawl teeth being pivotably mounted in the retractor frame sidewall, a cross bar on the lock bar extending across the belt reel and joining the pawl teeth;

resilient mounting means exterior of the frame sidewalls for mounting the reel shaft in the sidewalls for reel rotation, said mounting means being deflectable under loads greater than said first predetermined loads to allow the ratchet wheel teeth and reel shaft to deflect, the cutouts having walls located adjacent the ratchet toothed wheels to be engaged by the ratchet wheel teeth when the mounting means is deflected; and said ratchet teeth engaging the cutout walls in the retractor frame walls when the resilient mounting means is deflected at loads greater than the first predetermined loads translating the reel and both of the ratchet teeth to generally simultaneously engage the cutouts to stop rotation of the ratchet wheels and translation displacement of the reel.

2. A retractor in accordance with claim 1 in which openings are formed in the retractor frame sidewalls and have seats for the pawl teeth, said pawl teeth being elongated and receiving a columnar loading between the ratchet teeth and the seat therefor in the retractor frame sidewalls.

3. A retractor in accordance with claim 2 in which the pawl teeth and the ratchet wheels are substantially coplanar with the retractor frame sidewalls.

4. A retractor in accordance with claim 1 in which the inertia-actuating means includes a drive ratchet wheel fixed to the reel for rotation therewith and includes a drive pawl to engage the drive ratchet wheel and means operable when the drive pawl locks with the drive ratchet wheel to cause the lock bar to engage the ratchet wheels.

5. A safety belt retractor comprising:
a frame;
a reel mounted for rotation on said frame and carrying a coil of seat belt webbing for protaction with rotation of the reel; and
an inertia-locking mechanism for selectively arresting protraction of said belt from the reel;
said reel comprising a shaft and pair of toothed ratchet wheels and the coil of seat belt webbing disposed therebetween;
said locking mechanism including a lock bar having a pair of elongated, columnar pawl teeth and a cross bar joining the same, said pawl teeth being movable between a first position permitting rotation of said reel and a second position preventing rotation thereof, said pawl teeth being in load-bearing contact with said toothed wheels when in said second positions as to prevent rotation of said toothed wheels;
said frame having a pair of sidewalls with cutouts formed therein and said toothed wheels being disposed substantially within the cutouts in the sidewalls of the frame;
said frame including flexible support means for rotatably supporting said reel thereon and flexing so as to permit slight translation of said reel when said reel is subjected to high translational forces;
said frame further including load-bearing, annular non-toothed surfaces at the cutouts for engaging said toothed wheels to bear a portion of the translational forces on said reel when said reel is slightly translated, said elongated, columnar pawl teeth engaging the ratchet toothed wheels to stop rotation and at increasing loading causing the flexible support means too flex and to shift the toothed hatchet wheels into engagement with the smooth cutout walls and to reduce the loads on the pawl teeth to prevent their buckling because of the loads transmitted by the toothed wheels to the annular, non-toothed load bearing surfaces.

6. A retractor in accordance with claim 5 in which the pawl teeth are located outwardly of the coil to engage the toothed wheels in locking engagement when the coil diameter is larger than the diameter of a circle defined by the tips of the ratchet wheel teeth.

7. A safety belt retractor in accordance with claim 5 wherein said loadbearing surfaces comprise substantially smooth surfaces engaging said toothed wheels.

8. A safety belt retractor in accordance with claim 5 wherein said pawl has at least one load-bearing member with a forward edge for contacting said toothed wheel and a rearward edge abutting said frame, said load-bearing member having a longitudinal axis extending through said forward edge and said rearward edge, whereby said load-bearing member is in column load when engaging said toothed wheel.

9. A compact seat belt retractor comprising:
a non-resilient, U-shaped retractor frame having a rear wall and a pair of sidewalls integrally connected together,
each of said sidewalls having substantially annular openings therein and having front edges,
a reel mounted to turn about an axis through the sidewalls,
a coil of webbing on the reel having its outer winding of webbing positioned closely adjacent the rear wall and extending to adjacent the front edges of the sidewalls to provide a large coil of webbing,
a pair of ratchet wheels each projecting into one of the annular openings in the sidewalls of the retractor frame and each being substantially coplanar with one of the sidewalls of the retractor frame,
teeth on the ratchet wheels defining a first predetermined diameter,
side edges of the coil being disposed closely adjacent interior surfaces on the sidewalls to reduce the width of the retractor,
a pair of pawl teeth pivotally mounted in openings in the retractor frame sidewalls and each being substantially coplanar with one of the sidewalls of the retractor frame, said pair of pawl teeth having first ends for engaging the pair of ratchet wheels and having opposite ends pivotally mounted in the retractor frame sidewalls,
resilient mounting means exterior of the frame sidewalls for mounting the reel for rotation about its axis, said resilient mounting means being deflectable under very substantial loads to allow the pair of ratchet wheels and the reel to deflect; and
said teeth of booth of said ratchet wheels engaging the annular openings in respective retractor frame sidewalls when the resilient mounting means is deflected, the engagement of the ratchet wheel teeth with the sidewall openings being concurrent with engagement of the ratchet wheel teeth with the pawl teeth, the pawl teeth transmitting load to the retractor frame sidewalls at the opposite ends of the pawl teeth and the ratchet wheels engaging the retractor walls transmitting load to the retractor frame walls.

* * * * *

UNITED STATES PATENT AND TRADEMARK OFFICE
CERTIFICATE OF CORRECTION

PATENT NO. : 5,050,815
DATED : September 24, 1991
INVENTOR(S) : Doty, et al.

It is certified that error appears in the above-identified patent and that said Letters Patent is hereby corrected as shown below:

Column 2, Line 45, change "!rom" to --from--.

Column 3, Line 26, change "with-" to --with--.

Column 4, Line 2, change "tops" to --tips--.

Column 4, Line 21, change "sidewall" to --sidewalls--.

Column 5, Line 15, change "1" to --reel--.

Column 5, Line 28, change "side-walls" to --sidewalls--.

Column 5, Line 51, change "end" to --and--.

Column 5, Line 60, change "been" to --seen--.

Column 6, Line 37, change "pa" to --pawl--.

Column 6, Line 55, change "pushings" to --bushings--.

Column 6, Line 66, change "wi-1" to --will--.

Column 7, Line 16, change "mo-e" to --more--.

Column 7, Line 55, change "bas-." to --base--.

Column 7, Line 67, after "FIG. 3" insert a period.

Column 8, Line 3, change "reels" to wheels--.

UNITED STATES PATENT AND TRADEMARK OFFICE
CERTIFICATE OF CORRECTION

PATENT NO. : 5,050,815

DATED : September 24, 1991

INVENTOR(S) : Doty, et al.

Page 2 of 2

It is certified that error appears in the above-identified patent and that said Letters Patent is hereby corrected as shown below:

Column 8, Line 11, after "FIG. 3" insert a comma.

IN THE CLAIMS:

Column 8, Line 35, change "off" to --of--.

Column 9, Line 61, change "too" to --to--.

Column 9, Line 62, change "hatchet" to --ratchet--.

Signed and Sealed this

Twenty-third Day of February, 1993

*Attest:*

STEPHEN G. KUNIN

*Attesting Officer*  *Acting Commissioner of Patents and Trademarks*